Nov. 8, 1960    A. A. SCARLETT ET AL    2,959,233
TRACTOR MOUNTED PLOW
Filed March 1, 1956    3 Sheets-Sheet 1

Nov. 8, 1960  A. A. SCARLETT ET AL  2,959,233
TRACTOR MOUNTED PLOW
Filed March 1, 1956  3 Sheets-Sheet 3

INVENTORS
Arthur A. Scarlett
Ronald E. Penfold
Clifford B. Harrop
Paul O. Pippel Atty.

United States Patent Office 2,959,233
Patented Nov. 8, 1960

1

2,959,233

TRACTOR MOUNTED PLOW

Arthur A. Scarlett, Hamilton, Ontario, Ronald E. Penfold, Aldershot, Ontario, and Clifford B. Harrop, Ancaster, Ontario, Canada, assignors to International Harvester Company, a corporation of New Jersey Filed Mar. 1, 1956, Ser. No. 568,745

8 Claims. (Cl. 172—274)

This invention relates to agricultural implements and particularly to plows. More specifically, the invention concerns a tractor mounted moldboard plow wherein novel means are provided for controlling the operation thereof.

The plow of this invention was designed for integral connection with a tractor to be raised and lowered thereby, and is particularly adapted for use with a tractor having a hitch structure of the two-point type wherein laterally spaced elongated socket members are provided for the sliding reception of complementary shaft-like members on the implement, whereby the implement becomes a unit with the tractor.

An object of the invention is the provision of a plow of improved construction adapted for integral connection with a tractor, wherein means are incorporated in the plow structure for improving its operation under varying operating conditions.

Another object of the invention is the provision of an improved moldboard plow construction adapted for integral connection with a tractor and having novel cushioning means incorporated in the plow structure for cushioning the plow against shocks encountered in operation.

Another object of the invention is the provision of an improved tractor mounted plow including a hitch structure which is integrally connectable to the implement attaching structure on a tractor, and wherein the frame supporting the plow bottoms is pivotable about a transverse axis with respect to the hitch structure.

Other objects and advantages of the invention will become clear from the following detailed description when read in conjunction with the accompanying drawings wherein.

Figure 1:
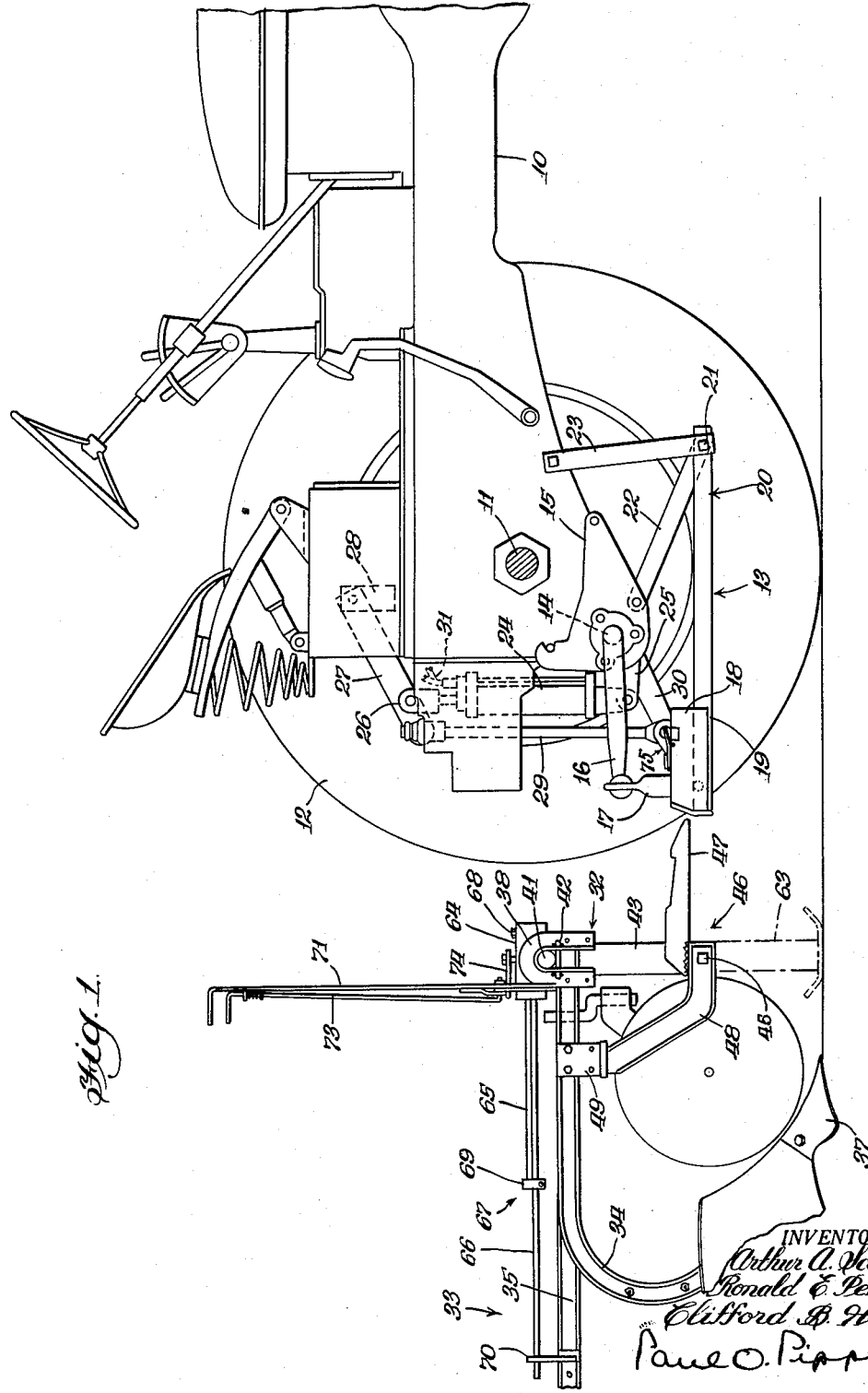
Figure 1 is a view in side elevation of the rear end of a tractor, with one wheel removed, having an implement attaching structure of the two-point type incorporated therein, and showing a portion of the plow of this invention, with parts removed for clarity, detached from the tractor but in position for connection thereto.

Referring to the drawings, the numeral 10 designates the body of a tractor of a conventional type having a rear axle 11 and laterally spaced rear drive wheels 12, only one of which is shown. The tractor is provided with an implement attaching structure 13 of a well known type which is shown only in side elevation in the drawings but may be understood to include a transversely extending rockshaft designated at 14 rotatably supported in brackets 15, one of which, it may be understood, is

2 provided on each side of the tractor body 10, and the ends of the shaft 14 are bent rearwardly to provide a pair of laterally spaced lift arms 16 only one of which appears in the drawing. Lift arms 16 are pivotally connected at their rear ends to vertically extending links 17, which are pivoted at their lower ends to laterally spaced elongated U-shaped socket-like members 18, only one of which is also shown, affixed to the rear ends of the laterally spaced, forwardly converging arms 19 of a drawbar 20, the forward end of which is pivotally connected at 21 to a pair of straps 22 and 23, secured to the tractor, and by which the forward end of the drawbar 20 is held in a fixed vertical position relative to the tractor.

Drawbar 20 is vertically swingable about the axis of the pivot means 21 and this is accomplished by power lift means comprising a hydraulic ram 24, anchored at its lower end to a bracket 25 affixed to the tractor body, and having the end of piston rod 26 connected to a link 27 which is pivotally mounted upon a lug 28 affixed to the tractor body and projecting upwardly therefrom. Link 27 is also connected by a rod 29 with an arm 30 mounted upon the rockshaft 14. Hydraulic ram 24 is a two-way ram and fluid under pressure is supplied thereto through hose lines 31 from a source, not shown, on the tractor.

The plow of this invention comprises an implement hitch structure 32 and a tool-supporting frame structure 33. The implement shown in the drawings is a three-bottom moldboard plow, and the tool-supporting frame includes a first short tool beam 34, a middle beam 35 the forward end of which is in alignment with the forward end of beam 34, and a third beam 36 extending rearwardly of beam 35 and having its forward end connected to the side of the latter. Each of the beams 34, 35 and 36 is bent downwardly at its rear end and has mounted thereon a plow bottom 37.

The forward ends of beams 34 and 35 have bearing members 38 and 39, respectively secured thereto, and the rear ends of adjacent beams are secured together in laterally spaced relationship by adjustable braces 40, by means of which the spacing between the plow bottoms may be adjusted.

Bearings 38 and 39 are U-shaped and are adapted to straddle and slidably receive a rigid transverse bar 41, cylindrical in section, the bar being confined in the bearings by means of pins 42. Bar or shaft 41 forms a part of the implement hitch 32 and has affixed thereto by welding the upper ends of a pair of laterally spaced standards 43 and 44.

The lower end of standard 43 is provided with a transverse pivot bolt 45 upon which is mounted one of the attaching members 46 of the hitch frame 32, for pivotal movement about the axis of the bolt 45. Attaching member 46 includes a longitudinally extending rectangularly shaped shaft 47 adapted to be slidably received in the right hand attaching element or socket 18 of the tractor hitch structure 13. Member 46 also includes an arm part 48 welded to the shaft portion 47 and mounted upon the bolt 45. Part 48 extends rearwardly and upwardly and is engageable with the base of a T-shaped stop member 49, affixed to the side of beam 34, for a purpose which will hereinafter become clear.

The lower end of the other standard 44 carries a transverse pivot bolt 50 upon which is pivotally mounted the downwardly projecting lug portion 51 of the lefthand attaching element or shaft 52, adapted for reception in the lefthand socket element 18 of the tractor attaching structure 13.

Figure 3:
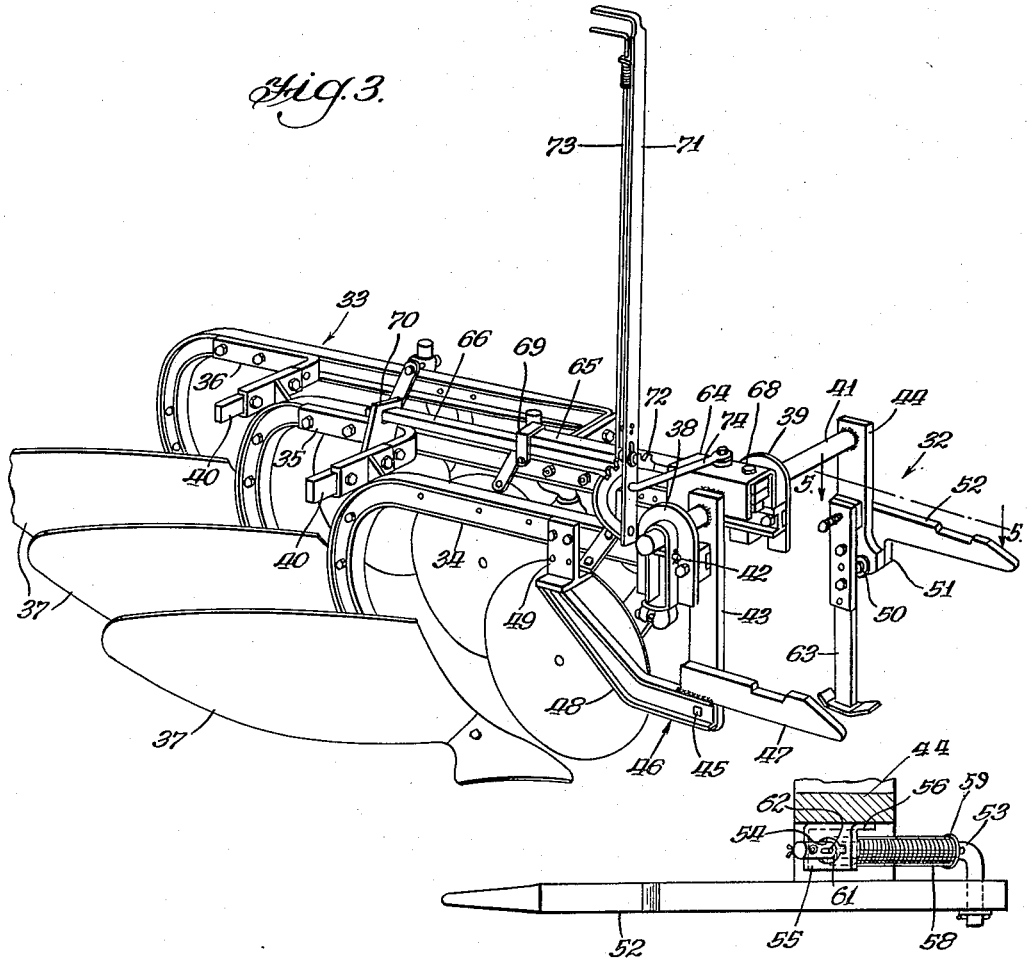
Figure 3 is a perspective view of the plow of this invention detached from the tractor.
Figures 4, 5:
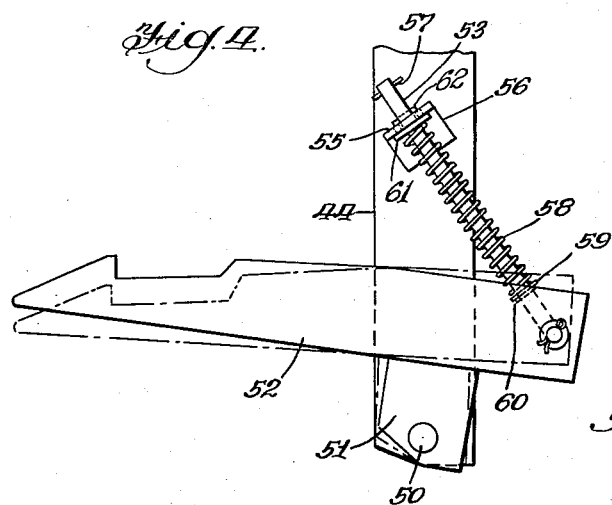
Figure 4 is a detail showing the pivotal connection of one of the implement shaft members to its associated hitch structure.
Figure 5 is a section on the line 5—5 of Figure 3.

In the position of the parts shown in Figure 3, with the implement detached from the tractor, attaching member 46 is held against pivoting about the axis of the bolt 45 by engagement of part 48 with stop 49. Pivoting of shaft 52 is restrained by means of a rod 53 having its lower end bent laterally and pivotally received in an opening provided in shaft 52 and having its upper end slidably received in an opening 54 provided in the laterally extending flange 55 of an angle plate or bracket 56 affixed to standard 44. Rod 53 is held against displacement from opening 54 by a cotter key 57, and is surrounded by a coil spring 58 engageable at its lower end with a washer 59 held in place by a pin 60 passed through an opening in the rod 53. The upper end of the spring engages a washer 61 which engages flange 55 holding the spring under compression. Opening 54 in flange 55 is suitably provided with a keyway, indicated in Figure 5, to slidably receive a pin 62 in rod 53 when spring 58 is compressed by engagement with flange 55.

A conventional supporting stand 63, shown in Figs. 1 and 3, which forms no part of this invention, is suitably mounted upon the standard 44 and serves to hold up the forward part of the implement, as indicated in Figures 1 and 3.

Figure 2:
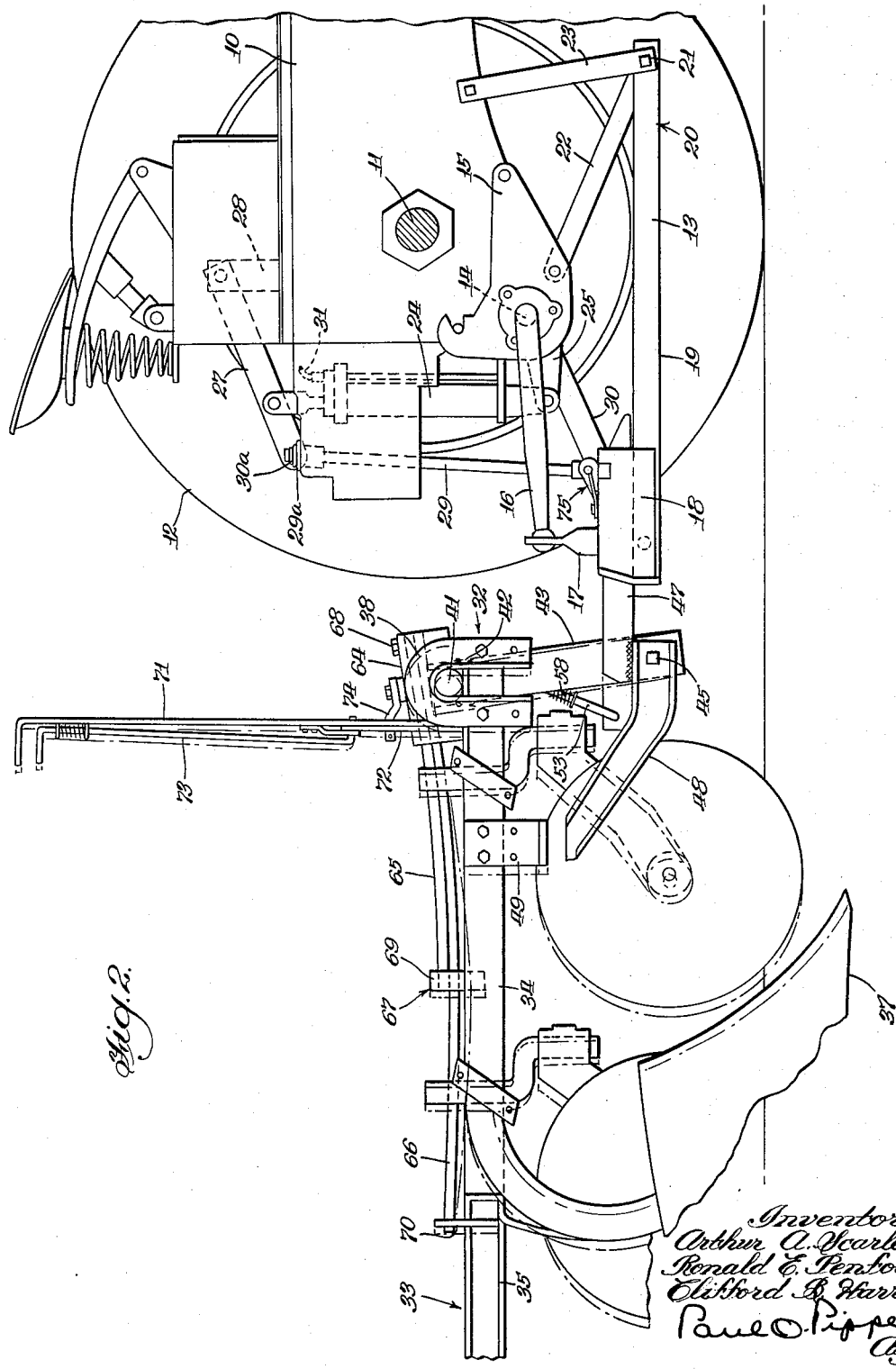
Figure 2 is a view similar to Figure 1 but on a larger scale showing the manner in which the plow takes the shock of an excess draft load such as may be caused by encountering hard ground or an obstruction.

Inasmuch as draw frame 20 is connected to the tractor at a fixed point represented by the pivot 21, the attaching elements or sockets 18 are moved vertically in an arc about the axis of pivot 21. Movement of the tool carrier rearwardly due to the rearward swinging of hitch frame 32 in operation to the position of Fig. 2 is resiliently opposed and to this end a U-shaped housing 64, inverted, is welded centrally to the bar 41 and straddles a pair of longitudinally extending sections 65 and 66 of a leaf spring 67. The forward ends of the leaf sections 65 and 66 are pivotally anchored to the housing 64 by a bolt 68. The rear end of section 65 is secured to section 66 by a clamp 69, and the rear end of section 66 is slidably received in a slot provided in a bracket 70 affixed to and extending upwardly from one of the braces 40, the slot being wide enough to accommodate lateral movement of leaf spring 67 along with hitch frame 32 relative to tool frame 33 for purposes of adjustment hereinafter to be described.

At this point it should be clear that the hitch part 32 of the implement frame is capable of swinging relative to the tool carrying part 33 about the axis of the transverse shaft or bar 41 which, with the standards 43 and 44, constitute a rigid portion of the implement hitch 32. It should also be clear that any pivoting of the hitch frame relative to the tool frame is yieldably resisted by the action of the leaf spring 67. In normal operation the parts are in the solid line position of Fig. 2, with the leaf spring 67 slightly flexed. Additional flexing of the leaf spring 67 and the position assumed by the tool carrier relative to the implement hitch frame 32 when excess draft is encountered by the plow bottom 37, is indicated in dotted lines in Figure 2.

In normal operation of the implement the part 48 is spaced from the stop 49 to accommodate floating of the implement during operation. When the shafts 47 and 52 have been received in the appropriate socket members 18 of the tractor hitch structures 13, the latter may be raised by operation of the hydraulic ram 24 to lift the implement. Upon vertical movement of the tractor hitch structure 13, the attaching member 46 and shaft 52 swing about their respective pivots on the standards 43 and 44 until the part 48 engages stop 49. The entire implement is then lifted for transport upon the tractor.

The sockets 18 of the tractor hitch structure are held adjustably in selected positions by operation of the ram 24, and floating movement of the implement is accommodated by the sliding reception of rod 29 in a swivel 29a on the end of lift arm 27, displacement of the rod from the swivel being prevented by collars 30a. When returning the implement to operating position from a transport position on the tractor, the tractor hitch structure 13 is lowered and the draw frame 20 pivots downwardly about the axis of the pivot 21.

In normal operation of the implement of this invention the spring 67 flexes somewhat to balance the draft of the tractor. When an obstruction is encountered the spring flexes more and the plow moves rearwardly hitch frame 32 pivoting about the axes of the bolts 45 and 50 by which the attaching members 47 and 52 are mounted upon the implement hitch frame. The bar 41 rocks relative to the plow beams and the parts assume a position such as is indicated in Fig. 2, the pressure of the spring 67 tending to return the plow to its normal operating position.

The novel plow construction of this invention accommodates lateral movement of the forward end of tool carrier 33 relative to the hitch frame 32, shaft 41 being slidable laterally relative to the bearings 38 and 39 and spring 67 being laterally movable therewith about a pivot represented by the sliding connection thereof with bracket 70, as pointed out hereinbefore. This is accomplished by power transmission means including a lever 71 pivotally mounted upon a quadrant 72 and provided with detent mechanism 73 cooperable with the teeth in the quadrant to hold the lever 71 in an adjusted position. Quadrant 72 is mounted upon plow beam 34 and is pivotally connected by a link 74 with the spring housing 64. By manipulating lever 71 power may be transmitted to the frame 32 to move it laterally to adjusted positions relative to the tool carrier 33 to compensate for side draft acting upon the plow bottoms 37. As is shown in Figure 3, the base of stop 49, engageable with the end of member 48, is wide enough to accommodate the lateral shifting referred to while acting as a stop for member 48. Displacement of shafts 47 and 52 from sockets 18 is prevented by any suitable latch means such as is indicated at 75, mounted on the sockets and cooperable with the shafts to lock them therein.

The novel plow structure of this invention and the operation thereof should be clearly understood from the foregoing description. It should likewise be understood that the invention has been described in its preferred embodiment and that modifications may be made therein without departing from the spirit of the invention or the scope of the appended claims.

What is claimed is:

1. A plow attachment for a tractor having a draw frame pivotally connected thereto and extending rearwardly therefrom and power lift means on the tractor connected to the draw frame for raising and lowering the latter, comprising a tool-carrying frame, a hitch frame at the forward end of the tool frame, said hitch frame including a vertical member, a longitudinally elongated attaching element pivotally mounted on the lower end of said vertical member and adapted for integral association with the tractor draw frame, whereby the hitch frame is lifted when the draw frame is lifted, said vertical member being swingable rearwardly about the pivot thereof on said attaching element, means forming a pivotal connection between the upper end of said vertical member and said tool frame, whereby the latter is capable of rearward swinging with said vertical member relative to said attaching element, and means in the connection of the tool frame to the hitch frame operative to oppose relative pivoting therebetween.

2. A plow attachment for a tractor having a draw frame pivotally connected thereto and extending rearwardly therefrom and power lift means on the tractor connected to the draw frame for raising and lowering the latter, comprising a tool-carrying frame, a hitch frame at the forward end of the tool frame, said hitch frame including a vertical member, a longitudinally elongated attaching element pivotally mounted on the lower end of said vertical member and adapted for integral association with the tractor draw frame, whereby the hitch frame is lifted when the draw frame is lifted, said vertical member being swingable rearwardly about the pivot thereof on said attaching element, means forming a pivotal connection between the upper end of said vertical member and said tool frame, whereby the latter is capable of rearward swinging with said vertical member relative to said attaching element, and means in the connection of the tool frame to the hitch frame operative to oppose relative pivoting therebetween, a stop member on the tool frame, and a part on said attaching element engageable with said stop when the lift means is actuated to raise the draw frame.

3. The invention set forth in claim 1, wherein the means opposing relative pivoting between the tool frame and the hitch frame is a spring anchored at one end to the hitch frame and at the other end to the tool frame.

4. A plow attachment for a tractor having lift means thereon and a draw frame extending rearwardly from the tractor and adapted to be raised and lowered by the lift means relative thereto, comprising a hitch frame including attaching members pivotally mounted on said hitch frame for rocking about a first transverse axis and extending forwardly therefrom, complementary attaching elements on the tractor draw frame adapted for connection with said attaching members on the hitch frame to form an integral association therewith, a tool-carrying frame mounted on said hitch frame for rocking of the latter about a second transverse axis relative to the tool frame, connecting means between the hitch frame and the tool frame adapted to prevent relative movement therebetween in normal operating conditions, whereby the hitch frame pivots about the connection thereof to said attaching members, said connecting means being yieldable under abnormal operating conditions to accommodate tilting of the hitch frame about its pivotal conneciton to said tool frame.

5. A plow attachment for a tractor having lift means thereon and a draw frame extending rearwardly from the tractor and adapted to be raised and lowered by the lift means relative thereto, comprising a hitch frame including attaching members pivotally mounted on said hitch frame for rocking about a first transverse axis and extending forwardly therefrom, complementary attaching elements on the tractor draw frame adapted for connection with said attaching members on the hitch frame to form an integral association therewith, a tool-carrying frame mounted on said hitch frame for rocking of the latter about a second transverse axis relative to the tool frame, connecting means between the hitch frame and the tool frame adapted to prevent relative movement therebetween in normal operating conditions, whereby the hitch frame pivots about the connection thereof to said attaching members, said connecting means being yieldable under abnormal operating conditions to accommodate tilting of the hitch frame about its pivotal connection to said tool frame, and stop means acting between the tool frame and said attaching members for limiting the relative movement therebetween when the lift means is actuated to raise the plow.

6. The invention set forth in claim 5, wherein means are provided for laterally shifting the tool frame to selected positions relative to the hitch frame and said stop means and said yieldable connecting means are effective in any position of the tool frame relative to the hitch frame.

7. A plow attachment for a tractor having lift means thereon and a draw frame extending rearwardly from the tractor and adapted to be raised and lowered relative thereto, comprising a tool-carrying frame, a hitch frame attached to the forward end of the tool frame, longitudinally elongated attaching means pivotally mounted on the hitch frame for rocking about a transverse axis and extending forwardly therefrom, means limiting the rocking of said attaching means relative to the hitch frame, complementary attaching elements on the tractor draw frame adapted for connection with said attaching members on the hitch frame to form an integral longitudinally rigid association therewith, a stop on the tool frame, a part on the attaching means on said hitch frame engageable with said stop to limit the relative rocking movement between the attaching elements and the hitch frame, and means in the connection of the tool frame to said hitch frame accommodating pivoting of the hitch frame relative to the tool frame about a transverse axis spaced from said first mentioned axis, said last mentioned means including a spring opposing said pivoting of the hitch frame.

8. A plow attachment for a tractor having a draw frame pivotally connected thereto and extending rearwardly therefrom and power lift means on the tractor connected to the draw frame for raising and lowering the latter, comprising a tool-carrying frame, a hitch frame at the forward end of the tool frame, means accommodating pivotal movement of the hitch frame relative to the tool frame for connecting the latter thereto including a spring opposing said pivotal movement of the hitch frame, longitudinally elongated attaching members pivotally mounted on the hitch frame for rocking about a transverse axis, complementary attaching elements on the tractor draw frame cooperative with the attaching members on the hitch frame to form a rigid connection therebetween for vertically moving the plow when the draw frame is raised and lowered, and means limiting the rocking of said attaching members relative to the hitch frame, comprising a stop on said tool frame and a part on one of the attaching members of the hitch frame engageable with said stop when the draw frame is raised to also raise the tool frame.

References Cited in the file of this patent

UNITED STATES PATENTS

| | | |
|---|---|---|
| 2,577,002 | Corl et al. | Dec. 4, 1951 |
| 2,579,553 | Daniel | Dec. 25, 1951 |
| 2,685,241 | Silver et al. | Aug. 3, 1954 |
| 2,724,315 | Roberson | Nov. 22, 1955 |
| 2,756,658 | Drummond | July 31, 1956 |

FOREIGN PATENTS

| | | |
|---|---|---|
| 1,077,043 | France | Apr. 28, 1954 |
| 849,313 | Germany | Sept. 15, 1952 |
| 556,859 | Great Britain | Oct. 26, 1943 |